June 16, 1942.    T. R. SMITH    2,286,768
POWER DRIVE FOR WASHING MACHINES
Filed Sept. 21, 1940    2 Sheets-Sheet 1

Witness:
Chas. P. Kursh

INVENTOR.
Thomas R. Smith
BY
Parkinson & Lane
ATTORNEYS.

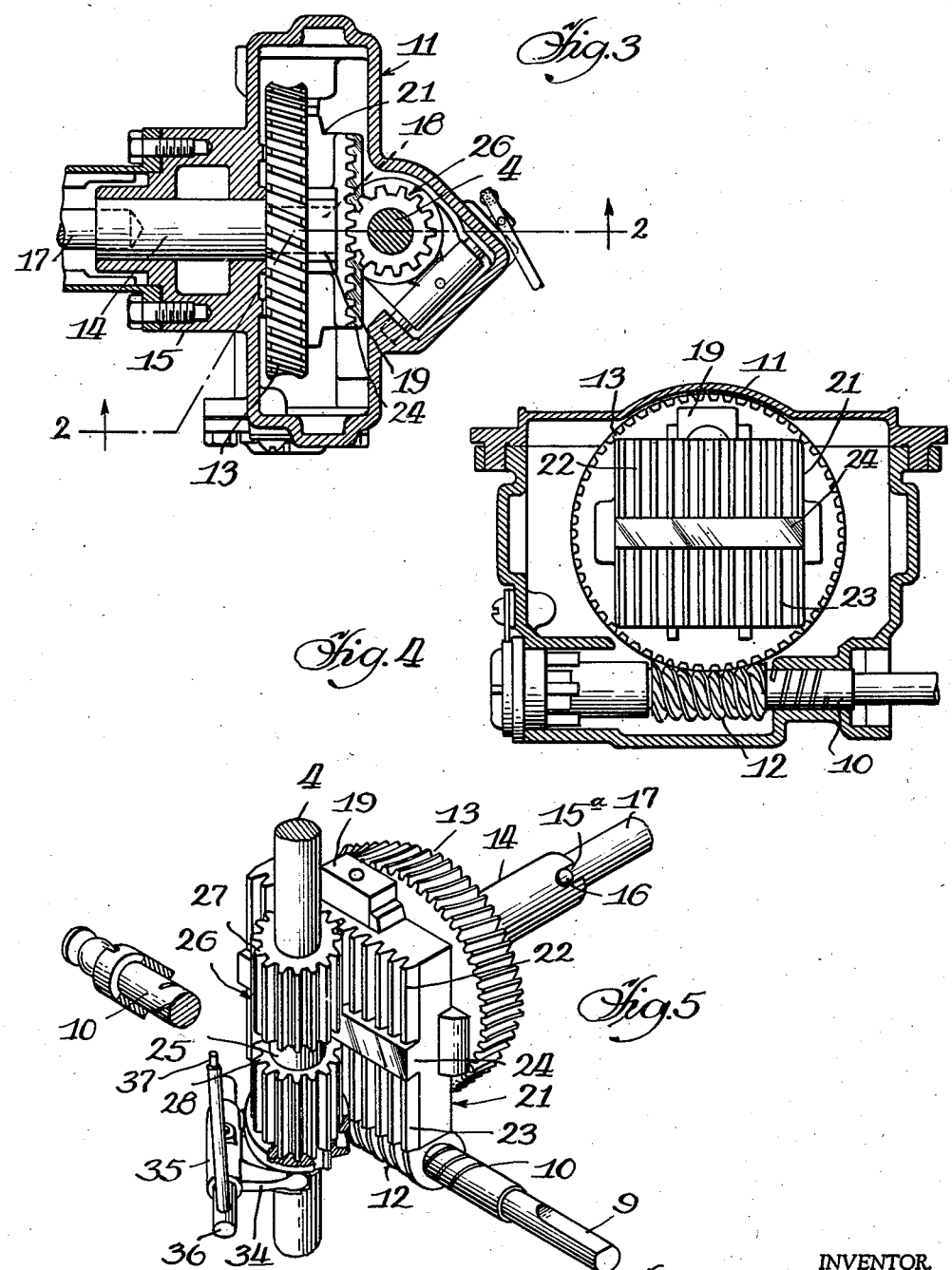

Patented June 16, 1942

2,286,768

UNITED STATES PATENT OFFICE 2,286,768

POWER DRIVE FOR WASHING MACHINES

Thomas R. Smith, Newton, Iowa, assignor to The Maytag Company, Newton, Iowa, a corporation of Delaware Application September 21, 1940, Serial No. 357,789

4 Claims. (Cl. 74—78)

The present invention relates to a power drive and more especially to a novel construction of a mechanical movement or power unit for oscillating an agitator or dolly shaft in a washing machine.

The invention further comprehends a novel drive mechanism for connecting the agitator or dolly shaft with a power source in such manner that the rotary motion of the power source is converted into an oscillatory motion of desired amplitude and rate or speed of oscillation. In the novel illustrative embodiment, I provide a simplified form of transmission including a novel form of rack and pinion maintained in continuous meshing engagement, with the pinion loose on the agitator or dolly shaft but adapted to be clutched thereto for imparting oscillatory motion to the shaft and its agitator or dolly.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawings, and while I have shown therein a preferred embodiment, it is to be understood that the same is susceptible of modification and change, and comprehends other details, arrangements of parts, features and constructions without departing from the spirit of the invention.

In the drawings:

Fig. 3 is a view in horizontal cross section through the gear housing and agitator or dolly shaft, but showing the drive mechanism in plan.

Fig. 4 is a view in vertical cross section taken on the irregular line 4—4 of Fig. 2.

Fig. 5 is a view in perspective of the novel drive mechanism or power unit.

Figure 1:
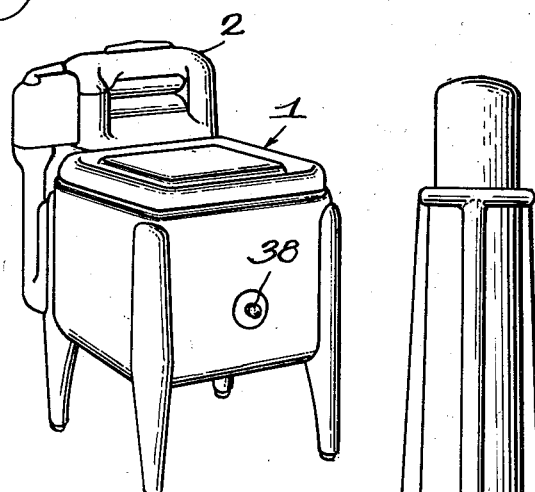
Fig. 1 is a perspective view of a washing machine of the agitator or dolly type embodying the novel drive mechanism.

The illustrative embodiment of the invention as disclosed in the drawings is shown as embodied in a washing machine 1 of the agitator or dolly type equipped with or without a wringer 2 of suitable construction. The agitator or dolly 3 is detachably mounted upon a vertical shaft 4 extending or projecting through the bottom of the tub, and which shaft is adapted to be oscillated through an arc of any desired amplitude and speed or rate of oscillation. Any suitable power supply such as a motor 5 may be provided for driving the power unit through a pulley 6, belt 7 and pulley 8, the latter being secured or keyed to the end 9 of a worm shaft 10 journalled in a gear housing 11.

A worm 12 is fixed upon the worm shaft and is in meshing engagement with a worm wheel or toothed disc 13 shown as detachably mounted upon a stud shaft 14 journalled in an extension 15 of the gear case. The outer end of this stud shaft 14 is hollowed out and notched at 15ª to receive coupling projections or lugs 16 on the end of a shaft 17, which, in the disclosed embodiment, forms the drive shaft for the wringer 2, although this shaft may form a driving connection for a centrifugal drier or other mechanism.

The worm wheel or disc 13 is provided with an eccentric crank pin 18 journalled in a slide or collar 19 slidably operating in a vertical slot 20 in the rear face of a rack 21. This rack is provided with teeth 22 and 23 spaced apart by means of a ridge or guide 24 engaging and sliding in an annular slot 25 in the drive pinion 26. As in the rack 21, the pinion 26 is provided with teeth 27 and 28 spaced apart by the annular slot 25 with this slot and the guide 24 restraining the rack from up and down or vertical movement.

Figure 2:
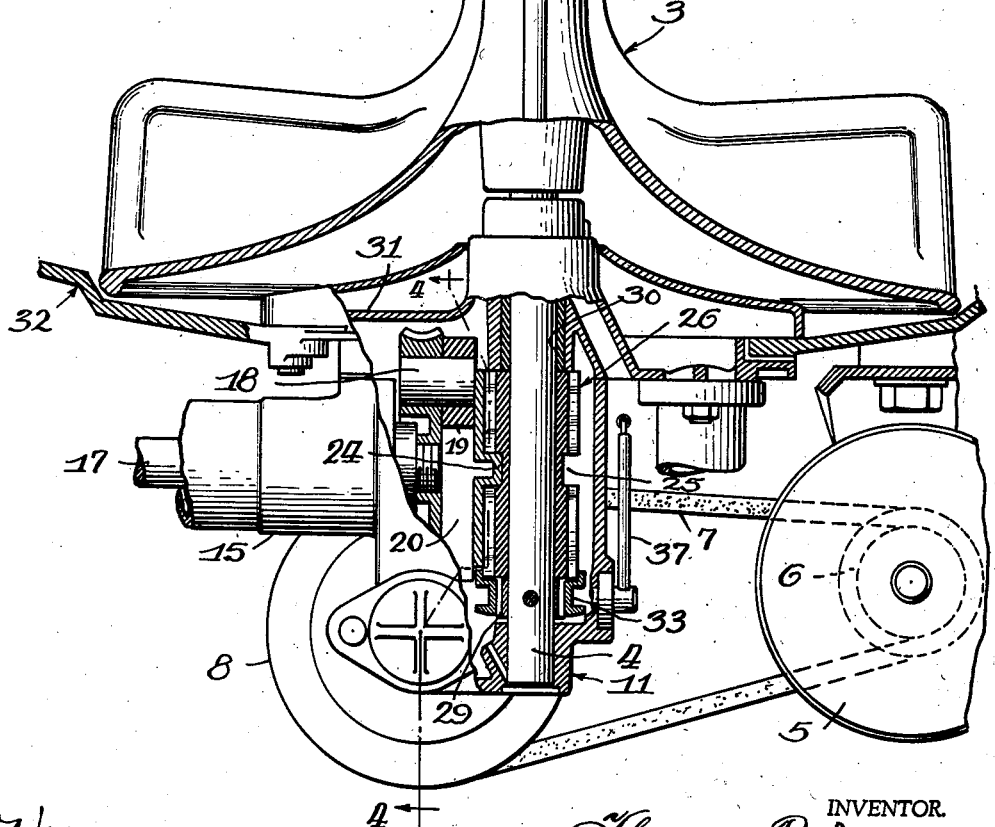
Fig. 2 is a view, part in vertical cross section and part in side elevation showing the novel power drive associated with an agitator or dolly shaft, the view being taken on the irregular line 2—2 of Fig. 3.

The pinion 26 is loose upon the agitator or dolly shaft 4 but restrained against vertical movement by means of the clutch torque 29 pinned to the agitator or dolly shaft at its lower end, and at its upper end by the lower end of the bushing or bearing 30 for this shaft. Any other means suitable for the purpose may be provided for preventing vertical movement of the pinion. As shown in Fig. 2, the shaft 5 is journalled at its lower end in the base of the gear case 11, while at its upper end it is journalled in the bushing or bearing 30 provided in the cover 31 of the gear case. This cover, in addition, provides a bottom plate for the washing machine tub 32.

A clutch member 33 is clutched to but slidable upon the clutch torque 29 and is so constructed and arranged that it may be elevated into clutching engagement with the lower end of the teeth of the pinion 26 and thereby oscillate or alternately rotate the agitator shaft. This clutch member 33 is adapted to be raised and lowered by the arms 34 projecting from a sleeve or collar 35 keyed or pinned to a rod 36, the latter being adapted to be rotated through an arc sufficient for such movement. This rotation or pivotal movement is accomplished through a wire or other connection 37 secured to the rod 34 and extending to a position readily accessible to the operator. In the embodiment selected to illustrate the invention, this wire is shown as connected to a knob 38 at the front of the tub in Fig. 1.

In operation, the worm 12 is driven from the motor or other power source 5 through the pulleys 6 and 8 and belt 7. This worm in turn rotates the worm wheel 13 and its eccentric crank pin 18. This crank pin, which extends from the face of the worm wheel and is journalled in and carries the slide block or collar 19, is slidably mounted in the slot 20 in the rear face of the rack 21. This rear face or back side of the rack bears against the face of the worm wheel and is guided thereby, thus preventing the rack from tipping or pivoting in any direction. As the worm wheel rotates, the eccentric crank pin is carried around in a circular path, and this causes the slide block 19 to move up and down in the vertical slot 20. The rack being prevented or constrained from moving vertically due to the ridge or guide 24 engaging in the annular groove 25 in the pinion 26, is reciprocated in a horizontal plane.

The rack teeth and the pinion 26, being long in a vertical direction, prevent the rack from wedging or cocking sidewise due to the sidewise torque of the slide block in its vertical movement. This long tooth engagement between the rack and pinion further acts as a guide to prevent the rack from tipping sidewise in which the slot would be tilted or thrown out of a vertical position.

From the above description and the disclosure in the drawings, it will be readily appreciated that the novel invention comprehends a simplified and efficient power unit or drive mechanism particularly adapted for a washing machine, although suitable for use in other constructions where it is desired to convert a rotary into an oscillatory motion.

Having thus disclosed the invention, I claim:

1. A power drive for oscillating the agitator shaft of a washing machine, comprising a driving shaft, a worm wheel on said driving shaft, a crank carried by said worm wheel, a rack member reciprocated by said crank, a pinion loose on the agitator shaft and in continuous meshing engagement with said rack, interengaging parts consisting in a projecting guide on the rack and a slot in the pinion for constraining relative vertical movement of said rack and pinion, and means for clutching the pinion to the agitator shaft.

2. In a power drive for oscillating the agitator shaft of a washing machine, mechanism for converting rotary into oscillatory motion and comprising a rotatable member, a crank carried by said member, a rack reciprocated by said crank, a pinion carried by the agitator shaft and in meshing engagement with said rack, and interengaging portions on the pinion and rack for constraining said pinion and rack from movement lengthwise of the agitator shaft.

3. In a reversing mechanism for converting rotary into oscillatory motion, a drive shaft, a driven shaft perpendicular thereto, a disc mounted on the drive shaft, a crank carried by said disc, a pinion carried by the driven shaft, a rack meshing with said pinion and having a slot for receiving said crank, said crank, rack and pinion being so related that when the crank is rotated, it reciprocates the rack and the latter in turn oscillates the pinion, a projecting guide on the rack and an annular slot in said pinion for receiving said guide and thereby restraining the rack from movement lengthwise of the driven shaft.

4. Means for oscillating an agitator or dolly in the tub of a washing machine, comprising a vertical agitator shaft adapted to project through the bottom of the tub, a drive pinion on said shaft, a rack having teeth in mesh with the teeth of said pinion, a drive shaft, a disc mounted on said drive shaft and faced toward a side of said rack, interengaging means between said disc and rack for effecting reciprocation of said rack upon rotation of the disc, mutually contactable portions on the disc and rack for preventing any substantial pivoting of the rack in any direction, and interengaging parts on the pinion and rack restraining said pinion and rack from vertical movement.

THOMAS R. SMITH.